United States Patent
Jeon et al.

(10) Patent No.: US 7,956,965 B2
(45) Date of Patent: Jun. 7, 2011

(54) VERTICALLY ALIGNED LIQUID CRYSTAL DISPLAY HAVING A WIDE VIEWING COMPENSATION FILM USING +A-FILM AND +C-FILM

(75) Inventors: Byoung Kun Jeon, Daejeon Metropolitan (KR); Sergey Belyaev, Daejeon Metropolitan (KR); Nikolay Malimonenko, Daejeon Metropolitan (KR); Jun Won Chang, Daejeon Metropolitan (KR); Soo Jin Jang, Seoul (KR)

(73) Assignee: LG Chem, Ltd., Seoul (KR)

( * ) Notice: Subject to any disclaimer, the term of this patent is extended or adjusted under 35 U.S.C. 154(b) by 282 days.

(21) Appl. No.: 11/666,557

(22) PCT Filed: Mar. 10, 2006

(86) PCT No.: PCT/KR2006/000853

§ 371 (c)(1),
(2), (4) Date: Feb. 27, 2008

(87) PCT Pub. No.: WO2006/107148

PCT Pub. Date: Oct. 12, 2006

(65) Prior Publication Data

US 2008/0204633 A1    Aug. 28, 2008

(30) Foreign Application Priority Data

Mar. 10, 2005   (KR) .................. 10-2005-0020183

(51) Int. Cl.
  *G02F 1/1335* (2006.01)
(52) U.S. Cl. ........... 349/119; 349/96; 349/102; 349/118
(58) Field of Classification Search ............. 349/96, 349/102, 117–119
See application file for complete search history.

(56) References Cited

U.S. PATENT DOCUMENTS 4,889,412 A   12/1989   Clerc et al.
(Continued)

FOREIGN PATENT DOCUMENTS

EP   0 689 084 A   12/1995
(Continued)

OTHER PUBLICATIONS

Anderson et al.; "Methods and Concerns of Compensating In-Plane Switching Liquid Crystal Displays," Jpn. J. Appl. Phys. 1, Regul. Pap. short Notes Rev. Pap (Japan), Japanese Journal of Applied Physics, Part 1 (Regular Papers, Short Notes & Review Papers), Nov. 2000, Japan Soc. Appl. Phys. Japan, vol. 39, No. 11, pp. 6388-6392.

(Continued)

*Primary Examiner* — Mark A Robinson
*Assistant Examiner* — Paisley L Arendt
(74) *Attorney, Agent, or Firm* — McKenna Long & Aldridge LLP

(57) ABSTRACT

This invention provides a vertically aligned liquid crystal display, including a first polarizing plate and a second polarizing plate having absorption axes perpendicular to each other and a vertically aligned panel provided therebetween and including vertically aligned liquid crystals having negative dielectric anisotropy, in which a +A-film and a +C-film are provided between the first polarizing plate and the vertically aligned panel, the +C-film is positioned between the first polarizing plate and the +A-film, and the optic axis of the +A-film is parallel to or perpendicular to the absorption axis of the first polarizing plate. According to this invention, the contrast of the vertically aligned liquid crystal display can be improved at surface-facing angle and tilt angle thereof and the color shift depending on the viewing angle in a dark state can be minimized, thus greatly increasing the viewing angle range of the vertically aligned liquid crystal display.

12 Claims, 7 Drawing Sheets

U.S. PATENT DOCUMENTS

| | | | |
|---|---|---|---|
| 6,115,095 | A | 9/2000 | Suzuki et al. |
| 6,141,075 | A | 10/2000 | Ohmuro et al. |
| 6,995,816 | B2 * | 2/2006 | Mi et al. .......................... 349/96 |
| 7,006,184 | B2 * | 2/2006 | Mi et al. ......................... 349/130 |
| 7,633,582 | B2 * | 12/2009 | Lin et al. ....................... 349/117 |
| 2001/0048497 | A1 | 12/2001 | Miyachi et al. |
| 2003/0193635 | A1 | 10/2003 | Mi et al. |
| 2003/0193636 | A1 | 10/2003 | Allen et al. |
| 2004/0066482 | A1 | 4/2004 | Tanaka |
| 2004/0080692 | A1 | 4/2004 | Kim et al. |
| 2007/0242188 | A1 | 10/2007 | Sakai |

FOREIGN PATENT DOCUMENTS

| | | |
|---|---|---|
| JP | 08-122770 | 5/1996 |
| JP | 11-287994 | 10/1999 |
| JP | 2001-350022 | 12/2001 |
| JP | 2002-055342 | 2/2002 |
| JP | 2002-296424 | 10/2002 |
| JP | 2003-195310 | 7/2003 |
| KR | 1999-0004389 A | 1/1999 |
| KR | 10-0265054 B1 | 6/2000 |
| TW | 200407416 | 5/2004 |
| TW | 200410028 | 6/2004 |
| TW | 200528847 | 9/2005 |
| TW | I240128 | 9/2005 |
| WO | WO 03/054111 | 7/2003 |
| WO | WO 2004/068223 | 8/2004 |
| WO | WO 2004/090627 A1 | 10/2004 |
| WO | WO 2006/001448 | 1/2006 |

OTHER PUBLICATIONS

Hikmet et al., "Gel Layers for Inducing Adjustable Pretilt Angles in Liquid Crystal Systems," Journal of Applied Physics, American Institute of Physics, New York, Vo. 70, No. 3, Aug. 1, 1991, pp. 1265-1269.

Houryu et al., "Optical Compensation of a MVA-LCD with Circular Polarizers", IDW, LCTP1-5, Dec. 2003, XP007016041, pp. 121-124.

Ohmuro et al., "33.3: Development of Super-High-Image-Quality Vertical-Alignment-Mode LCD", SID 97 Digest, 1997, XO000722823, pp. 845-848.

Chen et al., "21.2: Optimum Film Compensation Modes for TN and VA LCDs", Journal of the Society for Information Display, Jan. 1998, XP002284819, pp. 315-318.

* cited by examiner

VERTICALLY ALIGNED LIQUID CRYSTAL DISPLAY HAVING A WIDE VIEWING COMPENSATION FILM USING +A-FILM AND +C-FILM

This application is a national stage application of International Application No. PCT/KR2006/000853 filed on Mar. 10, 2006, and claims priority to Korean Application 10-2005-0020183 filed on Mar. 10, 2005. Both references are incorporated by reference, as if fully set forth herein.

TECHNICAL FIELD

The present invention relates, generally, to a liquid crystal display (LCD), and more particularly, to a vertically aligned LCD (hereinafter, referred to as "VA-LCD"), filled with liquid crystals having negative dielectric anisotropy ($\Delta\epsilon<0$), having a wide viewing angle compensation film using a +A-film and +C-film to improve contrast properties at surface-facing angle and tilt angle and to minimize a color shift depending on the viewing angle in a dark state so as to improve wide viewing angle properties.

BACKGROUND ART

Typically, LCDs, which have recently become widely used in the flat display field, suffer because they have a narrow viewing angle. The reasons why an image is differently displayed depending on the viewing angle in LCDs are that, first, there are problems related to the anisotropy of liquid crystals, and, second, a polarizing plate is deficient.

Thus, in order to improve a wide viewing angle of an LCD, a completely dark state and uniform brightness are required. In particular, the VA-LCD, in which the initial orientation of liquid crystals is in the vertical direction, unlike a TN mode, has two problems in regard to deteriorating viewing angle properties, that is, first, the dependence of performance of perpendicular polarizing plates on the viewing angle, and second, the dependence of the birefringence of the VA-LCD panel on the viewing angle.

Various attempts have been made to overcome the obstacles preventing realization of a wide viewing angle of LCDs attributed to such requirements and problems. As specific techniques for improvement, a method of using a viewing angle compensation film for compensating for a narrow viewing angle by changing And (multiplication of birefringence by thickness of a liquid crystal panel) depending on the angle, and a multidomain mode using a pixel, divided into a plurality of domains to improve a viewing angle, have been proposed.

As a specific example for improving the wide viewing angle of the VA-LCD using the viewing angle compensation film, a VA-LCD using a −C-plate compensation film (nx=ny>nz, where nx is the in-plane refractive index in the X-axis direction, ny is the in-plane refractive index in the Y-axis direction, and nz is the refractive index in the Z-axis direction, that is, the thickness direction) for compensating for the dark state of a VA-LCD when voltage is not applied is disclosed in U.S. Pat. No. 4,889,412. However, since the VA-LCD including only the −C-plate compensation film does not completely compensate therefor, light undesirably leaks at tilt angles.

In U.S. Pat. No. 6,141,075, a compensation film comprising a C-plate compensation film and an A-plate compensation film is disclosed, in which compensation for the dark state of the VA-LCD when voltage is not applied is said to be more efficiently realized than in other conventional cases. However, this patent suffers because the minimum contrast ratio at a tilt angle of 70° in a dark state is merely 20:1. Hence, to meet the goal of completely compensating for a viewing angle, contrast at surface-facing angle and tilt angle of LCDs should be improved, and the problem of color shift depending on the viewing angle in a dark state should be solved.

DISCLOSURE OF INVENTION

Technical Problem

Accordingly, the present invention has been devised to solve the problems mentioned above, and an object of the present invention is to provide a VA-LCD having an improved wide viewing angle by realizing high contrast properties at surface-facing angle and tilt angle of the VA-LCD due to minimum leakage of light in a dark state.

Another object of the present invention is to provide an achromatic VA-LCD capable of minimizing color shift depending on the viewing angle in a dark state.

The present inventors have found out that it is effective to use a +A-film and a +C-film so as to minimize the leakage of light in a dark state and to minimize a color shift in a dark state, and to compensate a viewing angle.

Further, they have found out that the +C-film should be disposed between a polarizing plate adjacent thereto and the +A-film, and that the optic axis of the +A-film should be perpendicular to or parallel to the absorption axis of the adjacent polarizing plate. Furthermore, the in-plane or thickness retardation value of the +A-film and +C-film has been found to vary with the retardation value of the internal protective film of the polarizing plate.

Based on the above facts, the present invention is characterized in that one or more +A-films and +C-films are appropriately disposed between the polarizing plate and the VA-panel, such that the leakage of light in a dark state of the VA-LCD is minimized so as to achieve high contrast, and color shift depending on the viewing angle in a dark state is minimized.

Technical Solution

In order to accomplish the above objects, the present invention provides a VA-LCD using a +A-film and a +C-film as a wide viewing angle compensation film.

Specifically, the present invention provides a VA-LCD comprising a first polarizing plate and a second polarizing plate having absorption axes perpendicular to each other and a VA-panel provided therebetween and including vertically aligned liquid crystals having negative dielectric anisotropy, in which one or more first +A-films and one or more first +C-films are provided between the first polarizing plate and the VA-panel, the first +C-film is positioned between the first polarizing plate and the first +A-film, and the optic axis of the first +A-film is perpendicular to or parallel to the absorption axis of the first polarizing plate.

Further, in the structure of the VA-LCD having one or more first +A-films and first +C-films between the first polarizing plate and the VA-panel, a second +A-film is provided between the second polarizing plate and the VA-panel, or a second +A-film and a second +C-film are provided therebetween, and the optic axes of the first +A-film and the second +A-film are perpendicular to or parallel to the absorption axis of the respective adjacent polarizing plate.

In addition, the present invention provides a VA-LCD including a first +A-film and a first +C-film having a retardation value in a preferred range depending on the configuration of the optic axis of the first +A-film or second +A-film and whether the second +A-film or the second +C-film is included.

In addition, the present invention provides a VA-LCD using a film having no thickness retardation value or a negative thickness retardation value as an internal protective film of the polarizing plate affecting the viewing angle properties of the VA-LCD. In the VA-LCD according to the present invention, the +A-film or the +C-film may function as the internal protective film of the polarizing plate.

Advantageous Effects

According to the present invention, the VA-LCD is advantageous because it has improved contrast at surface-facing angle and tilt angle thereof and because a color shift depending on the viewing angle in a dark state can be minimized, thus greatly increasing the viewing angle of the VA-LCD.

MODE FOR THE INVENTION

Figure 1:
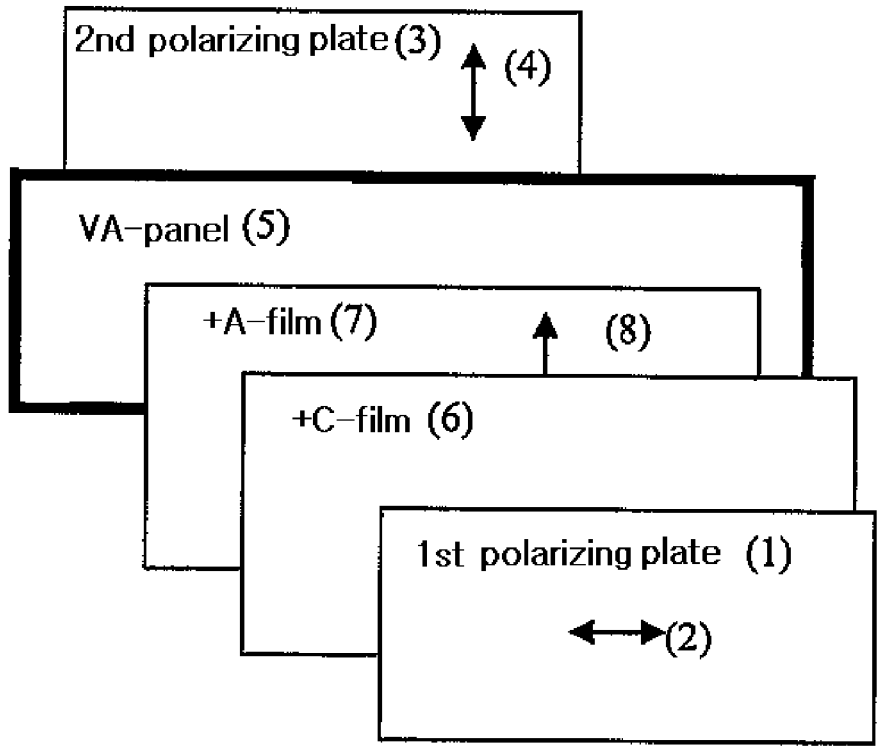
FIG. 1 is a view schematically showing the structure of a VA-LCD comprising a +A-film and a +C-film, according to a first embodiment of the present invention.

Hereinafter, a detailed description will be given of the present invention.

The LCD according to the present invention is a VA-LCD in which the optic axis of liquid crystals in a VA-panel is perpendicular to a polarizing plate. Particularly, the LCD of the present invention comprises a VA-panel in which liquid crystals having negative dielectric anisotropy ($\Delta \in <0$) are filled between two substrates, and a first polarizing plate and a second polarizing plate that are disposed on respective sides of the VA-panel, in which the absorption axis of the first polarizing plate is perpendicular to the absorption axis of the second polarizing plate. Both the first polarizing plate and the second polarizing plate may have an internal protective film and an external protective film.

In the present invention, the VA-LCD preferably adopts an MVA (Multidomain Vertically Aligned) mode or a VA mode using a chiral additive. In addition, a cell gap of a liquid crystal cell consisting of the VA-panel preferably is 3~8 ☐.

In the present invention, one or more +A-films and one or more +C-films are disposed between the first and/or second polarizing plate and the VA-panel of the VA-LCD having the above structure. The structure of the VA-LCD for compensating for the wide viewing angle using the +A-film and +C-film according to the present invention should satisfy the following general requirements.

That is, the VA-panel is positioned between the first polarizing plate and second polarizing plate having absorption axes perpendicular to each other, a first +A-film and a first +C-film are positioned between the first polarizing plate and the VA-panel, the first +A-film is disposed adjacent to the VA-panel, and the first +C-film is disposed between the first +A-film and the polarizing plate.

In such a case, the optic axis of the first +A-film should be perpendicular to or parallel to the absorption axis of the first polarizing plate. Based on the configuration of the optic axis of the first +A-film perpendicular to or parallel to the absorption axis of the first polarizing plate, the in-plane retardation value of the first +A-film and the thickness retardation value of the first +C-film are changed, thus obtaining preferred embodiments having various structures.

The VA-LCD, which satisfies the above-mentioned requirements, may further comprise one or more second +A-films between the second polarizing plate and the VA-panel, or one or more second +A-films and one or more second +C-films between the second polarizing plate and the VA-panel. In such cases, the in-plane retardation value of the +A-film and the thickness retardation value of the +C-film vary depending on the direction of the optic axis of the +A-film disposed adjacent to the first polarizing plate and/or second polarizing plate, thus obtaining various preferred embodiments.

The retardation film of the +A-film and +C-film used as the viewing angle compensation film may be defined as follows.

When the refractive index in an x-axis direction of the in-plane refractive index is represented by nx, the refractive index in a y-axis direction of the in-plane refractive index is represented by ny, and the refractive index in a z-axis direction as a thickness direction is represented by nz, the +A-film, which is used as a first type viewing angle compensation film, is as defined in Equation 1 below, and the +C-film, which is used as a second type viewing angle compensation film, is as defined in Equation 2 below:

$$nx > ny = nz \quad \text{Equation 1}$$

$$nx = ny < nz \quad \text{Equation 2}$$

As such, when the thickness of the film is represented by d, the in-plane retardation value is as defined in Equation 3 below, and the thickness retardation value is as defined in Equation 4 below.

$$R_{in} = (nx - ny) \times d \quad \text{Equation 3}$$

$$R_{th} = (nz - ny) \times d \quad \text{Equation 4}$$

Examples of +A-film having the in-plane refractive index properties mentioned above include a stretched cycloolefin polymer film, a stretched polycarbonate (PC) film, a horizontally aligned UV curing type liquid crystal film, etc. In addition, examples of +C-film having the thickness refractive index mentioned above include a vertically aligned UV curing type liquid crystal film, a biaxially stretched polymer film, etc.

Of the internal protective film and external protective film of the polarizing plate, the internal protective film of the polarizing plate affects the viewing angle properties of the VA-LCD, and in particular, the retardation value of the internal protective film greatly affects the viewing angle properties of the VA-LCD. Thus, the viewing angle compensation film of the VA-LCD should be designed in consideration of the retardation value of the internal protective film of the polarizing plate. In this way, the internal protective film of the polarizing plate is preferably exemplified by a film having no thickness retardation value, or having a negative thickness retardation value. Specific examples of the internal protective film of the polarizing plate include an un-stretched cycloolefin polymer (COP) film having a retardation value close to 0, a triacetate cellulose (TAC) film having a retardation value of 0, a triacetate cellulose film and a polynorbornene (PNB) film having a negative retardation value, etc.

Further, in order to improve the wide viewing angle while simplifying the structure of the VA-panel of the VA-LCD of the present invention, the +A-film may be used as the internal protective film of the polarizing plate, or the +C-film may be used as the internal protective film of the polarizing plate.

Below, the preferred embodiments of the present invention are described with reference to the drawings.

FIG. 1 shows the structure of a VA-LCD having a +A-film and a +C-film, according to a first embodiment of the present invention, the major characteristics of which are as follows.

As shown in FIG. 1, a +A-film 7 and a +C-film 6 are disposed between a first polarizing plate 1 and a VA-LCD panel 5, and the +C-film 6 is disposed between the first polarizing plate 1 and the +A-film 7. That is, the +A-film 7 is disposed adjacent to the VA-LCD panel 5.

As such, the optic axis 8 of the +A-film 7 is perpendicular to the absorption axis 2 of the first polarizing plate 1 that is disposed adjacent thereto.

In the VA-LCD according to the first embodiment, with the aim of minimizing the leakage of light in a dark state, the in-plane retardation value of the +A-film 7 preferably ranges from 130 nm to 300 nm at a wavelength of 550 nm, and the thickness retardation value of the +C-film 6 preferably ranges from 10 nm to 400 nm at a wavelength of 550 nm.

Examples of the internal protective film of the polarizing plate include an un-stretched cycloolefin polymer (COP) film having a retardation value close to 0, a triacetate cellulose (TAC) film having a retardation value of 0, a triacetate cellulose film and a polynorbornene (PNB) film having a negative retardation value, etc.

Examples of the +A-film 7 include a stretched cycloolefin polymer film, a stretched polycarbonate (PC) film, a horizontally aligned UV curing type liquid crystal film, etc. In addition, examples of the +C-film 6 include a vertically aligned UV curing type liquid crystal film, a biaxially stretched polymer film, etc. The +C-film 6 may be used as the internal protective film of the polarizing plate.

In Table 1 below are summarized the results of simulation of the contrast properties at a tilt angle of 70° performed while varying each of the following conditions: a) the retardation value of the +A-film 7, b) the retardation value of the +C-film 6, and c) the type of internal protective film of the first polarizing plate 1 and the second polarizing plate 3, which are design values for practical retardation films disposed as in FIG. 1.

TABLE 1

| Internal Protective Film of 2nd Polarizing Plate (Retardation Value) | Retardation Value of VA-Panel | +A-Film (Retardation Value) | +C-Film (Retardation Value) | Internal Protective Film of 1st Polarizing Plate (Retardation Value) | Minimum Contrast Ratio at Tilt Angle of 70° |
|---|---|---|---|---|---|
| COP (0 nm) | 330 nm | A-COP (256 nm) | +C-Film of LC (300 nm) | COP (0 nm) | 5 |
| TAC (−64 nm) | | A-COP (250 nm) | +C-Film of LC (320 nm) | TAC (−64 nm) | 15 |
| TAC (−128 nm) | | A-COP (225 nm) | +C-Film of LC (294 nm) | TAC (−128 nm) | 45 |
| PNB (−192 nm) | | A-COP (200 nm) | +C-Film of LC (278 nm) | PNB (−192 nm) | 130 |

TABLE 1-continued

| Internal Protective Film of 2nd Polarizing Plate (Retardation Value) | Retardation Value of VA-Panel | +A-Film (Retardation Value) | +C-Film (Retardation Value) | Internal Protective Film of 1st Polarizing Plate (Retardation Value) | Minimum Contrast Ratio at Tilt Angle of 70° |
|---|---|---|---|---|---|
| PNB (−192 nm) | | A-COP (200 nm) | Polystyrene (247 nm) | PNB (−192 nm) | 130 |
| PNB (−220 nm) | | A-COP (137 nm) | +C-Film of LC (214 nm) | PNB (−200 nm) | 150 |
| PNB (−220 nm) | | A-COP (187 nm) | +C-Film of LC (270 nm) | PNB (−200 nm) | 140 |
| PNB (−220 nm) | | +A-Film of Cured LC (180 nm) | +C-Film of LC (270 nm) | PNB (−220 nm) | 150 |
| PNB (−217 nm) | | +A-Film of Cured LC (200 nm) | — | Polystyrene (−50 nm) | 80 |
| PNB (−212 nm) | | Polycarbonate (190 nm) | +C-Film of LC (270 nm) | PNB (−212 nm) | 160 |

Referring to the results of Table 1, when the +A-film and the +C-film are disposed according to the structure of FIG. 1 and the retardation values of the films and the internal protective films of the polarizing plates are set as in Table 1, the minimum contrast ratio at a tilt angle of 70° in a dark state is determined to be good upto the range from 130:1 to 150:1 depending on set conditions. Compared to U.S. Pat. No. 6,141,075, which uses a −C-plate compensation film and an A-plate compensation film, in which the minimum contrast ratio at a tilt angle of 70° is merely 20:1, the VA-LCD according to the first embodiment of the present invention is confirmed to have excellent contrast properties.

Figure 2:
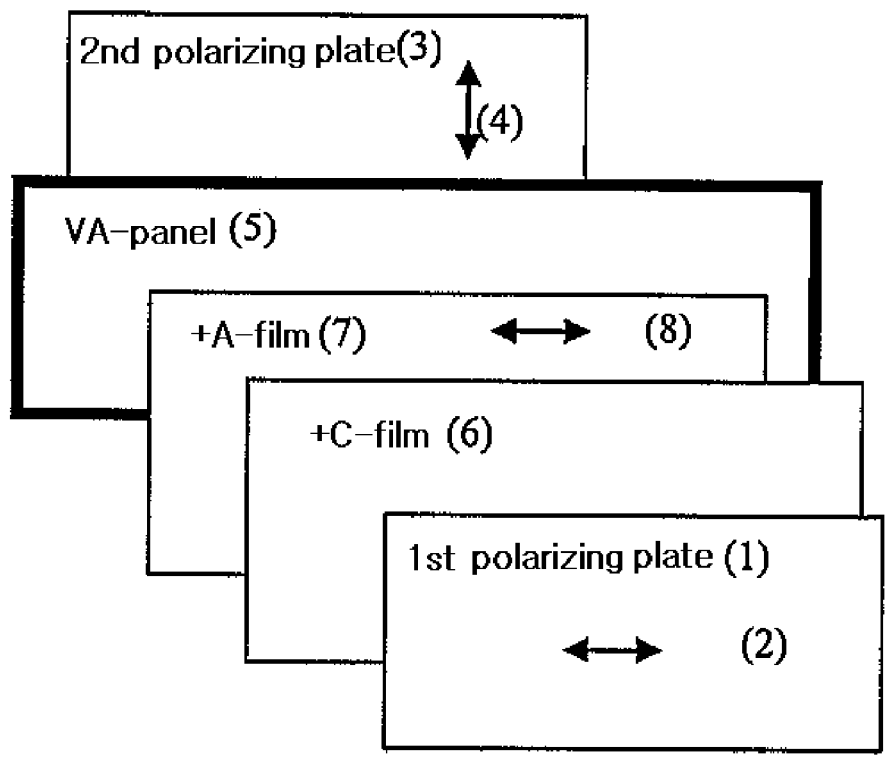
FIG. 2 is a view schematically showing the structure of a VA-LCD comprising a +A-film and a +C-film, according to a second embodiment of the present invention.

FIG. 2 shows the structure of a VA-LCD according to a second embodiment of the present invention. The structure of this VA-LCD has the following features.

The structure of FIG. 2 has the constituents and configuration sequence, same as the structure of FIG. 1, with the exception that the optic axis 8 of a +A-film 7 disposed between a VA-LCD panel 5 and a +C-film 6 is parallel to the absorption axis 2 of a first polarizing plate 1.

In the present invention, the concept including the structure according to the first embodiment, in which the optic axis 8 of the +A-film 7 is perpendicular to the absorption axis 2 of the first polarizing plate 1, and the structure according to the second embodiment, in which the optic axis 8 of the +A-film 7 is parallel to the absorption axis 2 of the first polarizing plate 1, that is, the concept in which the optic axis of the +A-film is perpendicular to or parallel to the absorption axis of the first polarizing plate, is regarded as the basic structure. In addition, the in-plane retardation value of the +A-film, the thickness retardation value of the +C-film adjacent thereto, and/or the retardation value of the internal protective film of the polarizing plate vary depending on the configuration of the optic axis of the +A-film.

According to the second embodiment, in order to minimize the leakage of light in a dark state, the in-plane retardation value of the +A-film 7 preferably ranges from 130 nm to 300 nm at a wavelength of 550 nm, and the thickness retardation value of the +C-film 6 preferably ranges from 200 nm to 600 nm at a wavelength of 550 nm.

Examples of the internal protective film of the polarizing plate include an un-stretched cycloolefin polymer (COP) film having a retardation value close to 0, a triacetate cellulose (TAC) film having a retardation value of 0, a triacetate cellulose film and a polynorbornene (PNB) film having a negative retardation value, etc.

Examples of the +A-film 7 include a stretched cycloolefin polymer film, a stretched polycarbonate film, a horizontally aligned UV curing type liquid crystal film, etc. In addition, examples of the +C-film 6 include a vertically aligned UV curing type liquid crystal film, a biaxially stretched polymer film, etc. The +C-film 6 may be used as the internal protective film of the polarizing plate.

In Table 2 below are summarized the results of simulation of the contrast properties at a tilt angle of 70° performed while varying each of the following conditions: a) the retardation value of the +A-film 7, b) the retardation value of the +C-film 6, and c) the type of internal protective film of the first polarizing plate 1 and the second polarizing plate 3, which are design values for practical retardation films disposed as in FIG. 2.

TABLE 2

| Internal Protective Film of 2nd Polarizing Plate (Retardation Value) | Retardation Value of VA-Panel | +A-Film (Retardation Value) | +C-Film (Retardation Value) | Internal Protective Film of 1st Polarizing Plate (Retardation Value) | Minimum Contrast Ratio at Tilt Angle of 70° |
|---|---|---|---|---|---|
| COP (0 nm) | 330 nm | A-COP (250 nm) | +C-Film of LC (330 nm) | COP (0 nm) | 4 |

TABLE 2-continued

| Internal Protective Film of 2nd Polarizing Plate (Retardation Value) | Retardation Value of VA-Panel | +A-Film (Retardation Value) | +C-Film (Retardation Value) | Internal Protective Film of 1st Polarizing Plate (Retardation Value) | Minimum Contrast Ratio at Tilt Angle of 70° |
|---|---|---|---|---|---|
| TAC (−64 nm) | | A-COP (250) | +C-Film of LC (320 nm) | TAC (−64 nm) | 10 |
| TAC (−128 nm) | | A-COP (240 nm) | +C-Film of LC (330 nm) | TAC (−128 nm) | 40 |
| PNB (−192 nm) | | A-COP (210 nm) | +C-Film of LC (372 nm) | PNB (−192 nm) | 75 |
| PNB (−300 nm) | | A-COP (137 nm) | +C-Film of LC (362 nm) | PNB (−220 nm) | 100 |
| PNB (−270 nm) | | A-COP (160 nm) | +C-Film of LC (365 nm) | PNB (−220 nm) | 120 |
| PNB (−270 nm) | | Polycarbonate (165 nm) | +C-Film of LC (357 nm) | PNB (−220 nm) | 120 |
| PNB (−270 nm) | | Polycarbonate (165 nm) | Polystyrene (324 nm) | PNB (−220 nm) | 140 |
| PNB (−240 nm) | | +A-Film of Cured LC (185 nm) | Polystyrene (334 nm) | PNB (−220 nm) | 120 |
| PNB (−240 nm) | | +A-Film of Cured LC (185 nm) | — | Polystyrene (−115 nm) | 125 |
| PNB (−280 nm) | | +A-Film of Cured LC (180 nm) | +C-Film of LC (495 nm) | PNB (−350 nm) | 95 |

From the results of Table 2, which are similar to those of Table 1 according to the first embodiment, when the +A-film and the +C-film are disposed according to the structure of the second embodiment and the retardation values of the films and the protective films of the polarizing plates are appropriately set, it can be confirmed that the minimum contrast ratio at a tilt angle of 70° in a dark state is good depending on set conditions and that the leakage of light in a dark state is minimized.

Figure 3:
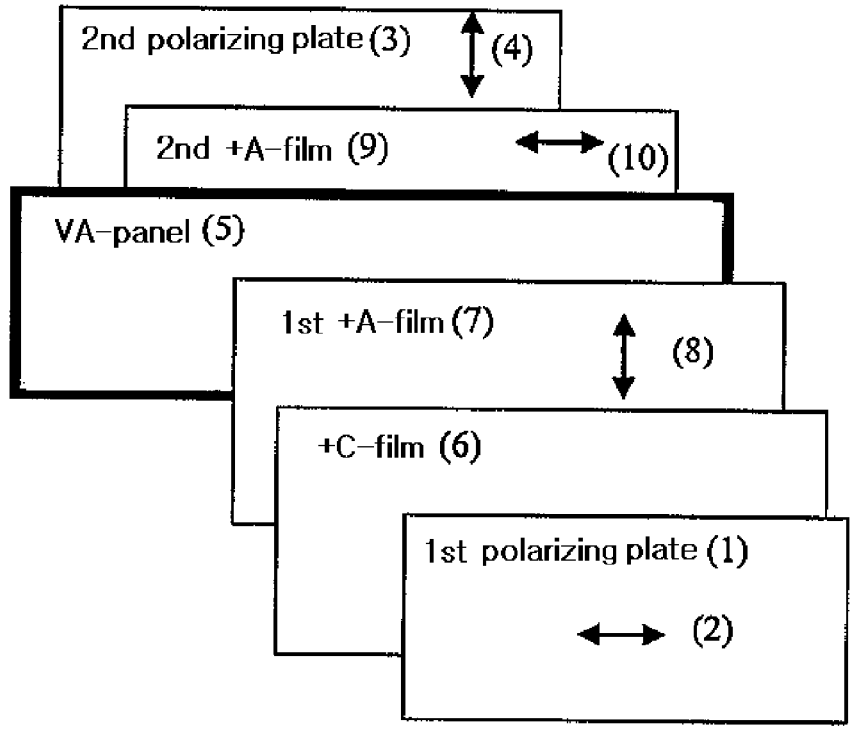
FIG. 3 is a view schematically showing the structure of a VA-LCD comprising two +A-films and a +C-film, according to a third embodiment of the present invention.

FIG. 3 shows the structure of a VA-LCD according to a third embodiment of the present invention, which is different from the structure according to the first embodiment in that a second +A-film 9 is further provided between the second polarizing plate and the VA-panel of the structure of FIG. 1, and the optic axis 10 of the second +A-film 9 is perpendicular to the absorption axis 4 of a second polarizing plate 3 adjacent thereto.

In the structure of FIG. 3, in order to minimize the leakage of light in a dark state, as in the structures according to the first and second embodiments, the first +A-film 7, the second +A-film 9, and the +C-film 6 also have the range of preferred retardation values. According to the third embodiment, the in-plane retardation value of the +A-film 7 preferably ranges from 180 nm to 250 nm at a wavelength of 550 nm, the in-plane retardation value of the second +A-film 9 ranges from 10 nm to 150 nm at a wavelength of 550 nm, and the thickness retardation value of the +C-film 6 preferably ranges from 200 nm to 600 nm at a wavelength of 550 nm.

Examples of the internal protective film of the polarizing plate include an un-stretched cycloolefin polymer (COP) film having a retardation value close to 0, a triacetate cellulose (TAC) film having a retardation value of 0, a triacetate cellulose film and a polynorbornene (PNB) film having a negative retardation value, etc.

Examples of the first +A-film 7 and second +A-film 9 include a stretched cycloolefin polymer film, a stretched polycarbonate (PC) film, a horizontally aligned UV curing type liquid crystal film, etc. In addition, examples of the +C-film 6 include a vertically aligned UV curing type liquid crystal film, a biaxially stretched polymer film, etc. The +C-film 6 may be used as the internal protective film of the polarizing plate.

In Table 3 below are summarized the results of simulation of the contrast properties at a tilt angle of 70° performed while varying each of the following conditions: a) the retardation value of the first +A-film 7 and the second +A-film 9, b) the retardation value of the +C-film 6, and c) the type of internal protective film of the first polarizing plate 1 and the second polarizing plate 3, which are design values for practical retardation films disposed as in FIG. 3.

TABLE 3

| Internal Protective Film of 2nd Polarizing Plate (Retardation Value) | 2nd +A-Film (Retardation Value) | Retardation Value of VA-Panel | 1st +A-Film (Retardation Value) | +C-Film (Retardation Value) | Internal Protective Film of 1st Polarizing Plate (Retardation Value) | Minimum Contrast Ratio at Tilt Angle of 70° |
|---|---|---|---|---|---|---|
| COP (0 nm) | A-COP (113 nm) | 330 nm | A-COP (215 nm) | +C-Film of LC (210 nm) | COP (0 nm) | 17 |
| COP (0 nm) | A-COP (113 nm) | | A-COP (215 nm) | +C-Film of LC (290 nm) | TAC (−64 nm) | 15 |
| TAC (−64 nm) | A-COP (55 nm) | | A-COP (212 nm) | +C-Film of LC (260 nm) | TAC (−64 nm) | 30 |
| TAC (−64 nm) | A-COP (55 nm) | | A-COP (212 nm) | +C-Film of LC (400 nm) | PNB (−192 nm) | 30 |
| TAC (−128 nm) | A-COP (20 nm) | | A-COP (206 nm) | +C-Film of LC (285 nm) | TAC (−128 nm) | 100 |
| TAC (−128 nm) | A-COP (20 nm) | | A-COP (206 nm) | +C-Film of LC (535 nm) | PNB (−350 nm) | 110 |
| TAC (−128 nm) | A-COP (20 nm) | | Polycarbonate (208 nm) | C-Film of LC (535 nm) | PNB (−350 nm) | 60 |
| TAC (−64 nm) | A-COP (55 nm) | | Polycarbonate (212 nm) | Polystyrene (215 nm) | TAC (−64 nm) | 22 |
| A-COP (Rin = 55 nm, Rth = 0 nm) | — | | COP (215 nm) | Polystyrene (245 nm) | TAC (−64 nm) | 16 |

From the results of Table 3, it can be confirmed that the minimum contrast ratio at a tilt angle of 70° in a dark state is good by appropriately setting the conditions for the retardation values of the +A-film, the +C-film and the internal protective films of the polarizing plates, and that the leakage of light in a dark state is minimized.

Figure 4:
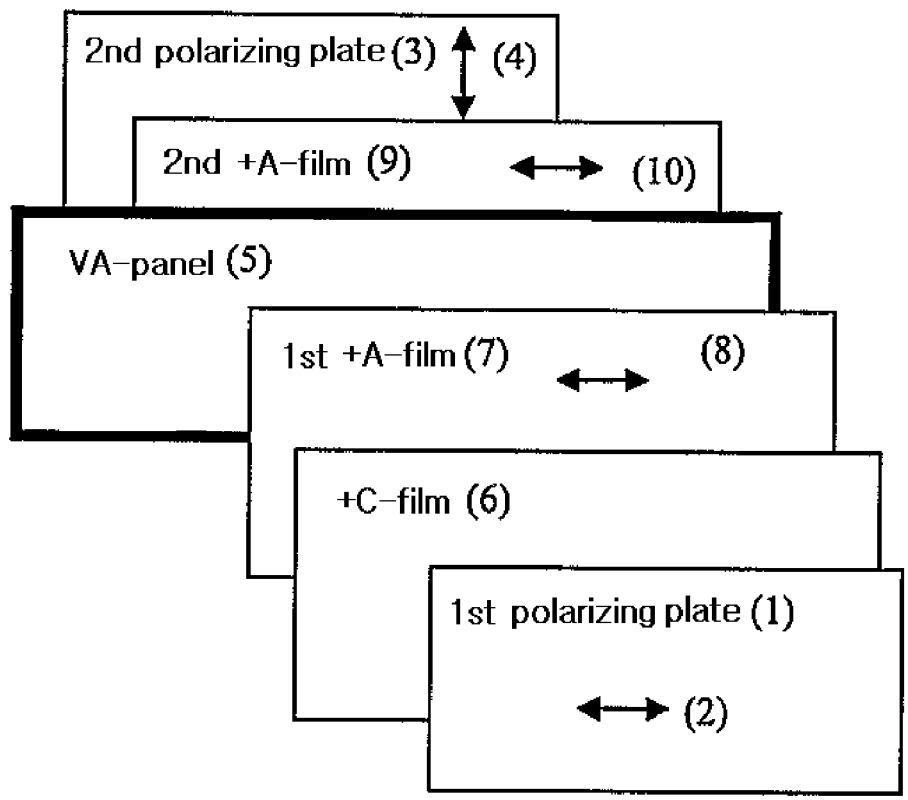
FIG. 4 is a view schematically showing the structure of a VA-LCD comprising two +A-films and a +C-film, according to a fourth embodiment of the present invention.

FIG. 4 shows the structure of a VA-LCD according to a fourth embodiment of the present invention, which is similar to the structure of FIG. 3, with the exception that the optic axis 8 of a first +A-film 7 is parallel to the absorption axis 2 of a first polarizing plate 1 adjacent thereto, unlike the structure of FIG. 3.

Even in the structure of the fourth embodiment, in order to minimize the leakage of light in a dark state, the first +A-film 7, the second +A-film 9, and the +C-film 6 have the range of preferred retardation values. That is, the in-plane retardation value of the first +A-film 7 preferably ranges from 200 nm to 300 nm at a wavelength of 550 nm, the in-plane retardation value of the second +A-film 9 ranges from 10 nm to 150 nm at a wavelength of 550 nm, and the thickness retardation value of the +C-film 6 preferably ranges from 180 nm to 600 nm at a wavelength of 550 nm.

Examples of the internal protective film of the polarizing plate include an un-stretched cycloolefin polymer (COP) film having a retardation value close to 0, a triacetate cellulose (TAC) film having a retardation value of 0, a triacetate cellulose film and a polynorbornene (PNB) film having a negative retardation value, etc.

Examples of the first +A-film 7 and second +A-film 9 include a stretched cycloolefin polymer film, a stretched polycarbonate (PC) film, a horizontally aligned UV curing type liquid crystal film, etc. In addition, examples of the +C-film 6 include a vertically aligned UV curing type liquid crystal film, a biaxially stretched polymer film, etc. The +C-film 6 may be used as the internal protective film of the polarizing plate.

In Table 4 below are summarized the results of simulation of the contrast properties at a tilt angle of 70° performed while varying the following conditions: a) the type of internal protective film of the first polarizing plate 1 and the second polarizing plate 3, b) the retardation value of the +C-film 6, and c) the retardation value of the first +A-film 7 and the second +A-film 9.

TABLE 4

| Internal Protective Film of 2nd Polarizing Plate (Retardation Value) | 2nd +A-Film (Retardation Value) | Retardation Value of VA-Panel | 1st +A-Film (Retardation Value) | +C-Film (Retardation Value) | Internal Protective Film of 1st Polarizing Plate (Retardation Value) | Minimum Contrast Ratio at Tilt Angle of 70° |
|---|---|---|---|---|---|---|
| COP (0 nm) | A-COP (100 nm) | 330 nm | A-COP (260 nm) | Polystyrene (195 nm) | COP (0 nm) | 18 |
| A-COP (−100 nm) | — | | A-COP (260 nm) | Polystyrene (195 nm) | COP (0 nm) | 18 |

TABLE 4-continued

| Internal Protective Film of 2nd Polarizing Plate (Retardation Value) | 2nd +A-Film (Retardation Value) | Retardation Value of VA-Panel | 1st +A-Film (Retardation Value) | +C-Film (Retardation Value) | Internal Protective Film of 1st Polarizing Plate (Retardation Value) | Minimum Contrast Ratio at Tilt Angle of 70° |
|---|---|---|---|---|---|---|
| TAC (−64 nm) | A-COP (70 nm) | | A-COP (262 nm) | Polystyrene (245 nm) | TAC (−64 nm) | 30 |
| TAC (−128 nm) | A-COP (40 nm) | | A-COP (255 nm) | Polystyrene (280 nm) | TAC (−128 nm) | 80 |
| TAC (−128 nm) | A-COP (40 nm) | | A-COP (253 nm) | +C-Film of LC (310 nm) | TAC (−128 nm) | 80 |
| TAC (−128 nm) | A-COP (26 nm) | | A-COP (245 nm) | +C-Film of LC (496 nm) | PNB (−300 nm) | 70 |

In the structure of the fourth embodiment, it can also be confirmed that the minimum contrast ratio at a tilt angle of 70° in a dark state depending on set conditions for the retardation values of the +A-film, the +C-film and the internal protective films of the polarizing plates is superior to conventional contrast ratios, and that the leakage of light in a dark state is minimized.

Figure 5:
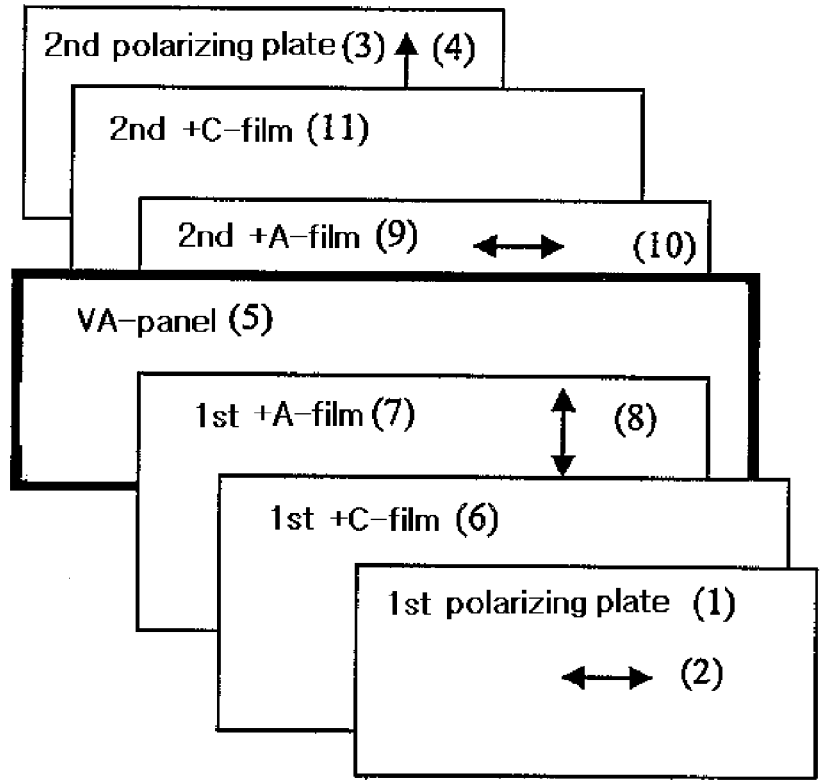
FIG. 5 is a view schematically showing the structure of a VA-LCD comprising two +A-films and two +C-films, according to a fifth embodiment of the present invention.

FIG. 5 shows the structure of a VA-LCD according to a fifth embodiment of the present invention.

The structure of FIG. 5 is characterized in that a second +A-film and a second +C-film are provided between a VA-panel 5 and a second polarizing plate 3 of the structure of FIG. 1, in which the second +C-film is positioned between the second polarizing plate 3 and the second +A-film 9, and the optic axis 10 of the second +A-film 9 is perpendicular to the absorption axis 4 of the second polarizing plate 3.

In the structure of FIG. 5, a first +A-film 7 and a first +C-film 6 are placed between a first polarizing plate 1 and the VA-panel 5, the first +C-film 6 is placed between the first polarizing plate 1 and the first +A-film 7, the first +A-film 7 is disposed adjacent to the VA-panel 5, and the optic axis 8 of the first +A-film 7 is perpendicular to the absorption axis 2 of the first polarizing plate 1, like the structures of FIGS. 1 and 3.

In order to minimize the leakage of light in a dark state from the structure of FIG. 5, the first +A-film 7, the second +A-film 9, the first +C-film 6 and the second +C-film 11 have the range of preferred retardation values. That is, the in-plane retardation value of the first +A-film 7 preferably ranges from 240 nm to 270 nm at a wavelength of 550 nm, and the in-plane retardation value of the second +A-film 9 ranges from 190 nm to 220 nm at a wavelength of 550 nm. Further, the thickness retardation value of the first +C-film 6 and second +C-film 11 preferably ranges from 100 nm to 600 nm at a wavelength of 550 nm.

Examples of the internal protective film of the polarizing plate include an un-stretched cycloolefin polymer (COP) film having a retardation value close to 0, a triacetate cellulose (TAC) film having a retardation value of 0, a triacetate cellulose film and a polynorbornene (PNB) film having a negative retardation value, etc.

Examples of the first +A-film 7 and second +A-film 9 include a stretched cycloolefin polymer film, a stretched polycarbonate (PC) film, a horizontally aligned UV curing type liquid crystal film, etc. In addition, examples of the first +C-film 6 and second +C-film 11 include a vertically aligned UV curing type liquid crystal film, a biaxially stretched polymer film, etc. The first +C-film 6 or second +C-film 11 may be used as the internal protective film of the polarizing plate.

In Table 5 below are summarized the results of simulation of the contrast properties at a tilt angle of 70° performed while varying the following conditions: a) the type of internal protective film of the first polarizing plate 1 and the second polarizing plate 3, b) the retardation value of the first +C-film 6 and the second +C-film 11, and c) the retardation value of the first +A-film 7 and the second +A-film 9.

TABLE 5

| Internal Protective Film of 2nd Polarizing Plate (Retardation Value) | 2nd +C-Film (Retardation Value) | 2nd +A-Film (Retardation Value) | Retardation Value of VA-Panel | 1st +A-Film (Retardation Value) | 1st +C-Film (Retardation Value) | Internal Protective Film of 1st Polarizing Plate (Retardation Value) | Minimum Contrast Ratio at Tilt Angle of 70° |
|---|---|---|---|---|---|---|---|
| COP (0 nm) | +C-Film of LC (140 nm) | +A-Film of Cured LC (200 nm) | 330 nm | +A-Film of Cured LC (250 nm) | +C-Film of LC (140 nm) | COP (0 nm) | 27 |
| TAC (−64 nm) | +C-Film of LC (206 nm) | +A-Film of Cured LC (200 nm) | | +A-Film of Cured LC (250 nm) | +C-Film of LC (206 nm) | TAC (−64 nm) | 30 |
| TAC (−64 nm) | +C-Film of LC (210 nm) | A-COP (200 nm) | | A-COP (250 nm) | +C-Film of LC (210 nm) | TAC (−64 nm) | 90 |
| TAC (−128 nm) | +C-Film of LC (282 nm) | A-COP (200 nm) | | A-COP (250 nm) | +C-Film of LC (282 nm) | TAC (−128 nm) | 110 |

TABLE 5-continued

| Internal Protective Film of 2nd Polarizing Plate (Retardation Value) | 2nd +C-Film (Retardation Value) | 2nd +A-Film (Retardation Value) | Retardation Value of VA-Panel | 1st +A-Film (Retardation Value) | 1st +C-Film (Retardation Value) | Internal Protective Film of 1st Polarizing Plate (Retardation Value) | Minimum Contrast Ratio at Tilt Angle of 70° |
|---|---|---|---|---|---|---|---|
| PNB (−250 nm) | +C-Film of LC (418 nm) | A-COP (200 nm) | | A-COP (250 nm) | +C-Film of LC (418 nm) | PNB (−250 nm) | 120 |

The structure of a VA-LCD according to a sixth embodiment of the present invention is characterized as follows.

Figure 6:
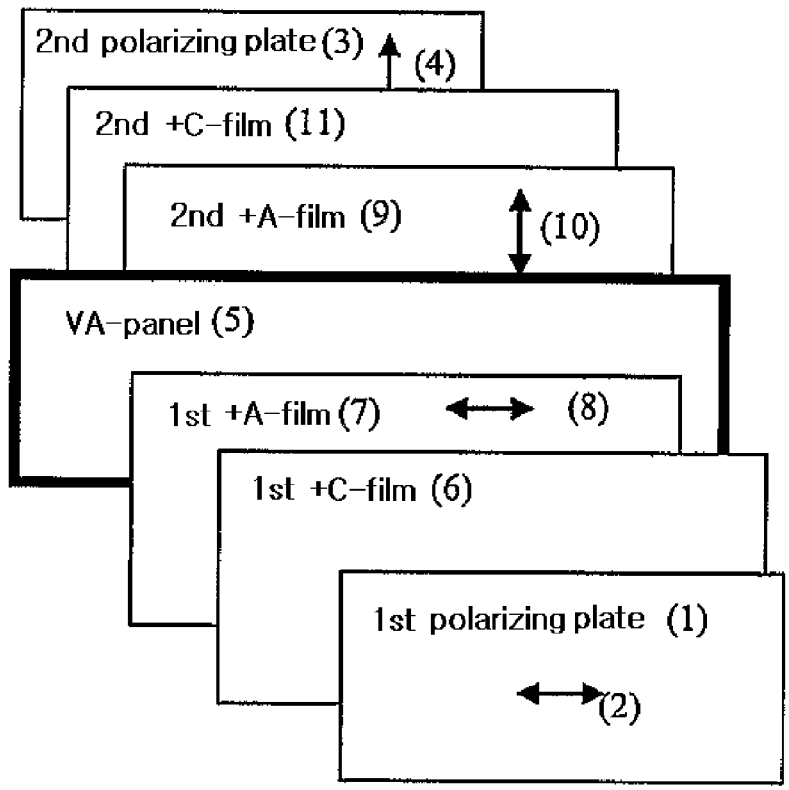
FIG. 6 is a view schematically showing the structure of a VA-LCD comprising two +A-films and two +C-films, according to a sixth embodiment of the present invention.

As shown in FIG. 6, a first +A-film 7 and a first +C-film 6 are placed between a first polarizing plate 1 and a VA-panel 5, the first +C-film 6 is placed between the first polarizing plate 1 and the first +A-film 7, the first +A-film 7 is disposed adjacent to the VA-panel 5, and the optic axis 8 of the first +A-film 7 is parallel to the absorption axis 2 of the first polarizing plate 1.

Further, a second +A-film 9 and a second +C-film 11 are placed between a second polarizing plate 3 and the VA-panel 5, the second +C-film 11 is placed between the second polarizing plate 3 and the second +A-film 9, the second +A-film 9 is disposed adjacent to the VA-panel 5, and the optic axis 10 of the second +A-film 9 is parallel to the absorption axis 4 of the second polarizing plate 3.

In the structure of FIG. 6, the in-plane retardation value of the first +A-film 7 and the second +A-film 9 ranges from 240 nm to 270 nm at a wavelength of 550 nm, and the thickness retardation value of the first +C-film 6 and the second +C-film 11 preferably ranges from 100 nm to 600 nm at a wavelength of 550 nm.

Examples of the internal protective film of the polarizing plate include an un-stretched cycloolefin polymer (COP) film having a retardation value close to 0, a triacetate cellulose (TAC) film having a retardation value of 0, a triacetate cellulose film and a polynorbornene (PNB) film having a negative retardation value, etc.

Examples of the first +A-film 7 and the second +A-film 9 include a stretched cycloolefin polymer film, a stretched polycarbonate (PC) film, a horizontally aligned UV curing type liquid crystal film, etc. In addition, examples of the first +C-film 6 include a vertically aligned UV curing type liquid crystal film, a biaxially stretched polymer film, etc. The first +C-film 6 or the second +C-film 11 may be used as the internal protective film of the first or second polarizing plate 1, 3, respectively.

In Table 6 below are summarized the results of simulation of the contrast properties at a tilt angle of 70° performed while varying the following conditions: a) the type of internal protective film of the first polarizing plate 1 and the second polarizing plate 3, b) the retardation value of the first +C-film 6 and the second +C-film 11, and c) the retardation value of the first +A-film 7 and the second +A-film 9.

TABLE 6

| Internal Protective Film of 2nd Polarizing Plate (Retardation Value) | 2nd +C-Film (Retardation Value) | 2nd +A-Film (Retardation Value) | Retardation Value of VA-Panel | 1st +A-Film (Retardation Value) | 1st +C-Film (Retardation Value) | Internal Protective Film of 1st Polarizing Plate (Retardation Value) | Minimum Contrast Ratio at Tilt Angle of 70° |
|---|---|---|---|---|---|---|---|
| Polystyrene (−175 nm) | — | +A-Film of Cured LC (260 nm) | 330 nm | +A-Film of Cured LC (260 nm) | — | Polystyrene (−175 nm) | 24 |
| TAC (−64 nm) | +C-Film of LC (244 nm) | A-COP (257 nm) | | A-COP (257 nm) | +C-Film of LC (244 nm) | TAC (−64 nm) | 23 |
| TAC (−128 nm) | +C-Film of LC (315 nm) | A-COP (257 nm) | | A-COP (257 nm) | +C-Film of LC (315 nm) | TAC (−128 nm) | 22 |
| PNB (−250 nm) | +C-Film of LC (450 nm) | A-COP (257 nm) | | A-COP (257 nm) | +C-Film of LC (450 nm) | PNB (−250 nm) | 20 |

The structure of a VA-LCD according to a seventh embodiment of the present invention is characterized as follows.

Figure 7:
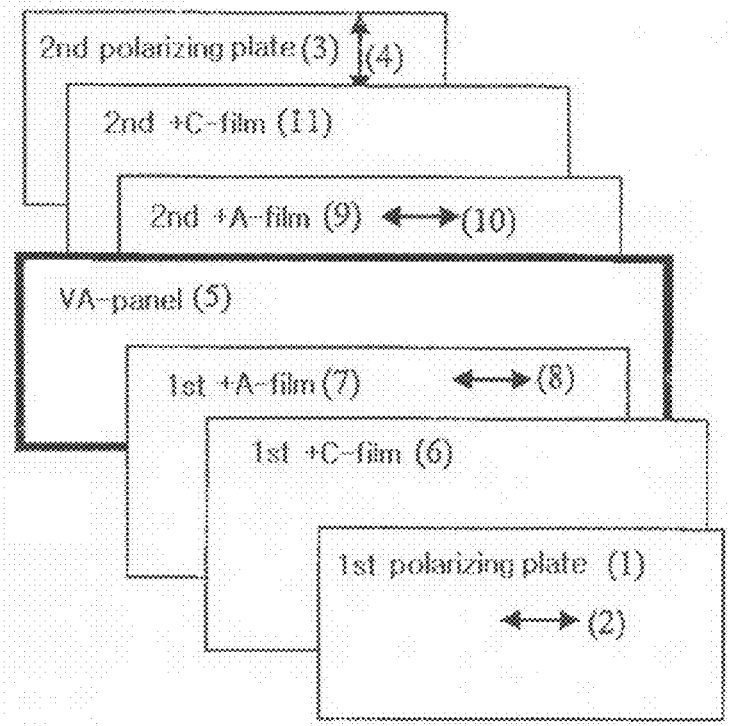
FIG. 7 is a view schematically showing the structure of a VA-LCD comprising two +A-films and two +C-films, according to a seventh embodiment of the present invention.

As shown in FIG. 7, a first +A-film 7 and a first +C-film 6 are placed between a first polarizing plate 1 and a VA-panel 5, the first +C-film 6 is placed between the first polarizing plate 1 and the first +A-film 7, the first +A-film 7 is disposed adjacent to the VA-panel 5, and the optic axis 8 of the first +A-film 7 is parallel to the absorption axis 2 of the first polarizing plate 1.

Further, a second +A-film 9 and a second +C-film 11 are placed between a second polarizing plate 3 and the VA-panel 5, the second +A-film 9 is disposed adjacent to the VA-panel 5, the second +C-film 11 is placed between the second polarizing plate 3 and the second +A-film 9, and the optic axis 10 of the second +A-film 9 is perpendicular to the absorption axis 4 of the second polarizing plate 3.

In order to minimize the leakage of light in a dark state from the structure of FIG. 7, the first +A-film 7, the second +A-film 9, the first +C-film 6, and the second +C-film 11 have the range of preferred retardation values. That is, the in-plane retardation value of the first +A-film 7 preferably ranges from 240 nm to 270 nm at a wavelength of 550 nm and the in-plane retardation value of the second +A-film 9 preferably ranges from 190 nm to 220 nm at a wavelength of 550 nm. Further, the thickness retardation value of the first +C-film 6 and the second +C-film 11 preferably ranges from 100 nm to 600 nm at a wavelength of 550 nm.

Examples of the internal protective film of the polarizing plate include an un-stretched cycloolefin polymer (COP) film having a retardation value close to 0, a triacetate cellulose (TAC) film having a retardation value of 0, a triacetate cellulose film and a polynorbornene (PNB) film having a negative retardation value, etc.

Examples of the first +A-film 7 and the second +A-film 9 include a stretched cycloolefin polymer film, a stretched polycarbonate film, a horizontally aligned UV curing type liquid crystal film, etc. In addition, examples of the first +C-film 6 and the second +C-film 11 include a vertically aligned UV curing type liquid crystal film, a biaxially stretched polymer film, etc. The +C-film 6 may be used as the internal protective film of the polarizing plate. The first +C-film 6 or the second +C-film 11 may be used as the internal protective film of the first or second polarizing plate 1, 3, respectively.

In Table 7 below are summarized the results of simulation of the contrast properties at a tilt angle of 70° performed while varying the following conditions: a) the type of internal protective film of the first polarizing plate 1 and the second polarizing plate 3, b) the retardation value of the first +C-film 6 and the second +C-film 11, and c) the retardation value of the first +A-film 7 and the second +A-film 9.

was 355 nm at a wavelength of 550 nm. As a +A-film 7, a stretched cycloolefin polymer film was used, and the in-plane retardation value of this film was 240 nm at a wavelength of 550 nm.

As the internal protective film of a first polarizing plate 1 and a second polarizing plate 3, a 80 ▯thick TAC was used, the thickness retardation value of which was −65 nm at a wavelength of 550 nm.

Figure 8:
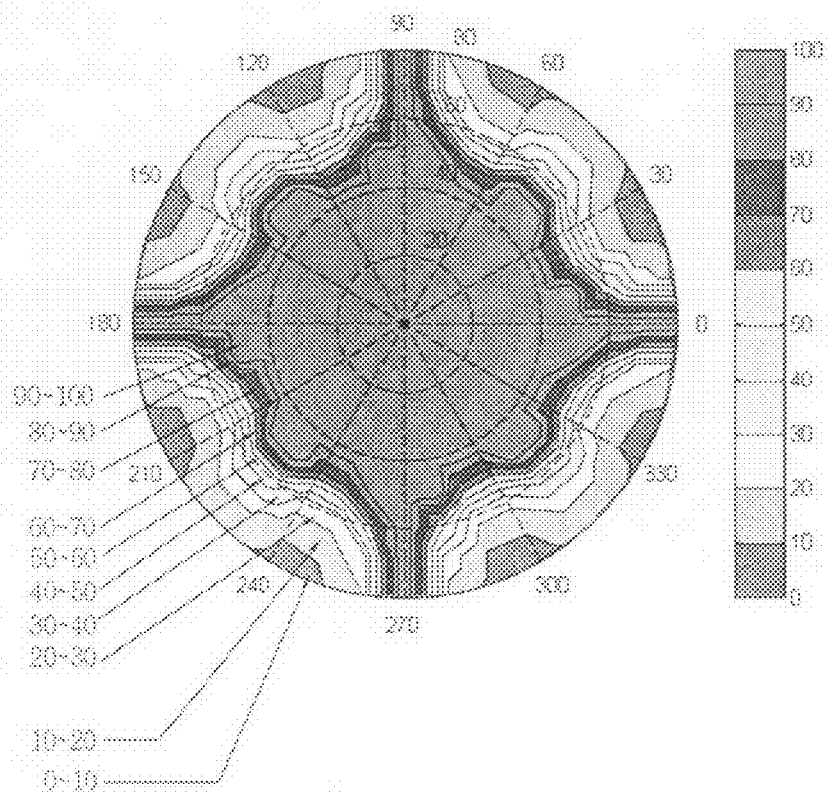
FIG. 8 is a view showing the result of simulation of the contrast ratio of the VA-LCD according to the first embodiment of the present invention when using white light and varying the tilt angle in the range of 0~80° at intervals of 20 with respect to the entire radius angle.

When white light was used, a graph showing contrast at tilt angles from 0 to 80° with respect to the entire radius angle is shown in FIG. 8.

Example 2

The VA-LCD of FIG. 2 according to the second embodiment of the present invention was fabricated.

In particular, a VA-LCD panel 5 filled with liquid crystals having a cell gap of 3.35 ▯, a pre-tilt angle of 89°, dielectric anisotropy (Δ∈) of liquid crystals of −4.9, and birefringence (Δn) of 0.098 was used. The VA-panel 5 had a thickness retardation value of 328 nm at a wavelength of 550 nm.

As a +C-film 6, a vertically aligned UV curing type liquid crystal film was used, the thickness retardation value of which was 355 nm at a wavelength of 550 nm. As a +A-film 7, a stretched cycloolefin polymer film was used, the in-plane retardation value of which was 240 nm at a wavelength of 550 nm.

As the internal protective film of a first polarizing plate 1 and a second polarizing plate 3, a 160 ▯thick TAC was used, the thickness retardation value of which was −130 nm at a wavelength of 550 nm.

TABLE 7

| Internal Protective Film of 2nd Polarizing Plate (Retardation Value) | 2nd +C-Film (Retardation Value) | 2nd +A-Film (Retardation Value) | Retardation Value of VA-Panel | 1st +A-Film (Retardation Value) | 1st +C-Film (Retardation Value) | Internal Protective Film of 1st Polarizing Plate (Retardation Value) | Minimum Contrast Ratio at Tilt Angle of 70° |
|---|---|---|---|---|---|---|---|
| Polystyrene (−175 nm) | — | A-COP (200 nm) | 330 nm | A-COP (257 nm) | — | Polystyrene (−166 nm) | 100 |
| COP (0 nm) | +C-Film of LC (132 nm) | A-COP (200 nm) | | A-COP (257 nm) | +C-Film of LC (175 nm) | COP (0 nm) | 110 |
| TAC (−64 nm) | +C-Film of LC (204 nm) | A-COP (200 nm) | | A-COP (257 nm) | 액정 +C-Film (250 nm) | TAC (−64 nm) | 100 |
| TAC (−64 nm) | +C-Film of LC (278 nm) | A-COP (200 nm) | | A-COP (257 nm) | +C-Film of LC (320 nm) | TAC (−128 nm) | 83 |

A better understanding of the present invention may be obtained through the following examples which are set forth to illustrate, but are not to be construed as the limit of the present invention.

Example 1

The VA-LCD of FIG. 1 according to the first embodiment of the present invention was fabricated.

In particular, a VA-LCD panel 5 filled with liquid crystals having a cell gap of 3.35 ▯, a pre-tilt angle of 89°, dielectric anisotropy (Δ∈) of liquid crystals of −4.9, and birefringence (Δn) of 0.098 was used. The VA-panel 5 had a thickness retardation value of 328 nm at a wavelength of 550 nm.

Figure 9:
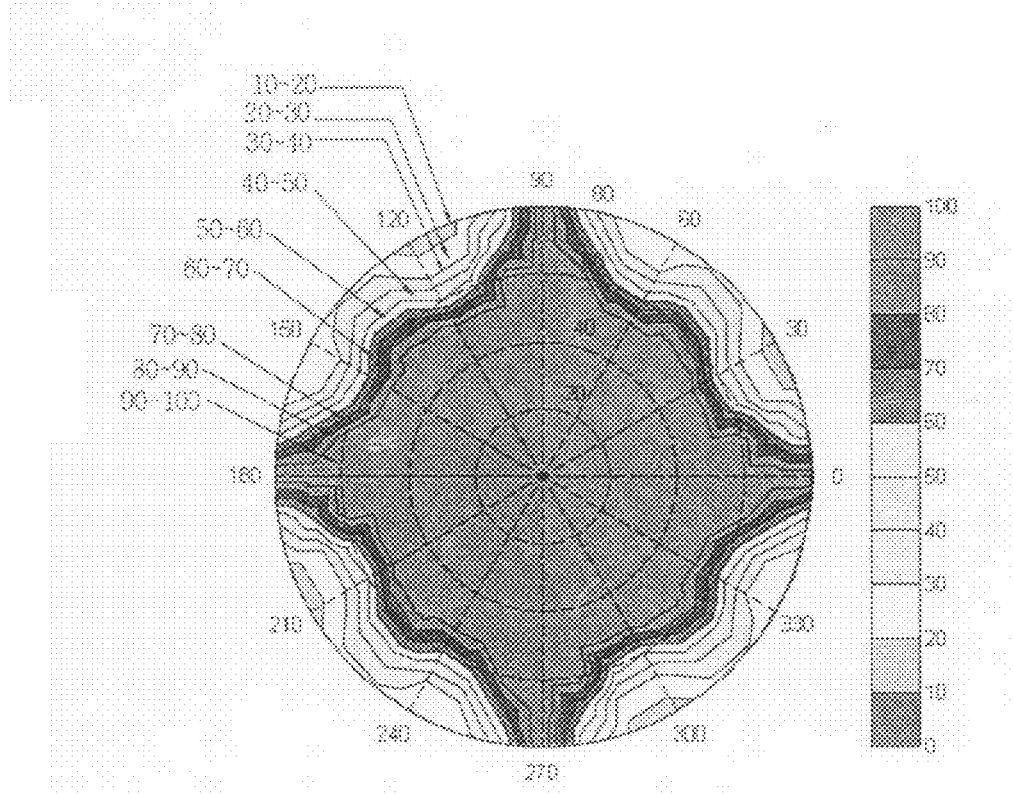
FIG. 9 is a view showing the result of simulation of the contrast ratio of the VA-LCD according to the second embodiment of the present invention when using white light and varying the tilt angle in the range of 0~80° at intervals of 2° with respect to the entire radius angle.

As a +C-film 6, a vertically aligned UV curing type liquid crystal film was used, the thickness retardation value of which When white light was used, a graph showing contrast at tilt angles from 0 to 80° with respect to the entire radius angle is shown in FIG. 9.

Example 3

The VA-LCD of FIG. 3 according to the third embodiment of the present invention was fabricated.

In particular, a VA-LCD panel 5 filled with liquid crystals having a cell gap of 3.35 ▯, a pre-tilt angle of 89°, dielectric anisotropy (Δ∈) of liquid crystals of −4.9, and birefringence (Δn) of 0.098 was used. The VA-panel 5 had a thickness retardation value of 328 nm at a wavelength of 550 nm.

As a +C-film 6, a vertically aligned UV curing type liquid crystal film was used, the thickness retardation value of which was 272 nm at a wavelength of 550 nm. As a first +A-film 7, a stretched cycloolefin polymer film was used, the in-plane retardation value of which was 212 nm. As a second +A-film 9, a stretched cycloolefin polymer film was used, the in-plane retardation value of which was 55 nm at a wavelength of 550 nm.

As the internal protective film of a first polarizing plate 1 and a second polarizing plate 3, a 80 ☐thick TAC was used, the thickness retardation value of which was −65 nm at a wavelength of 550 nm.

Figure 10:
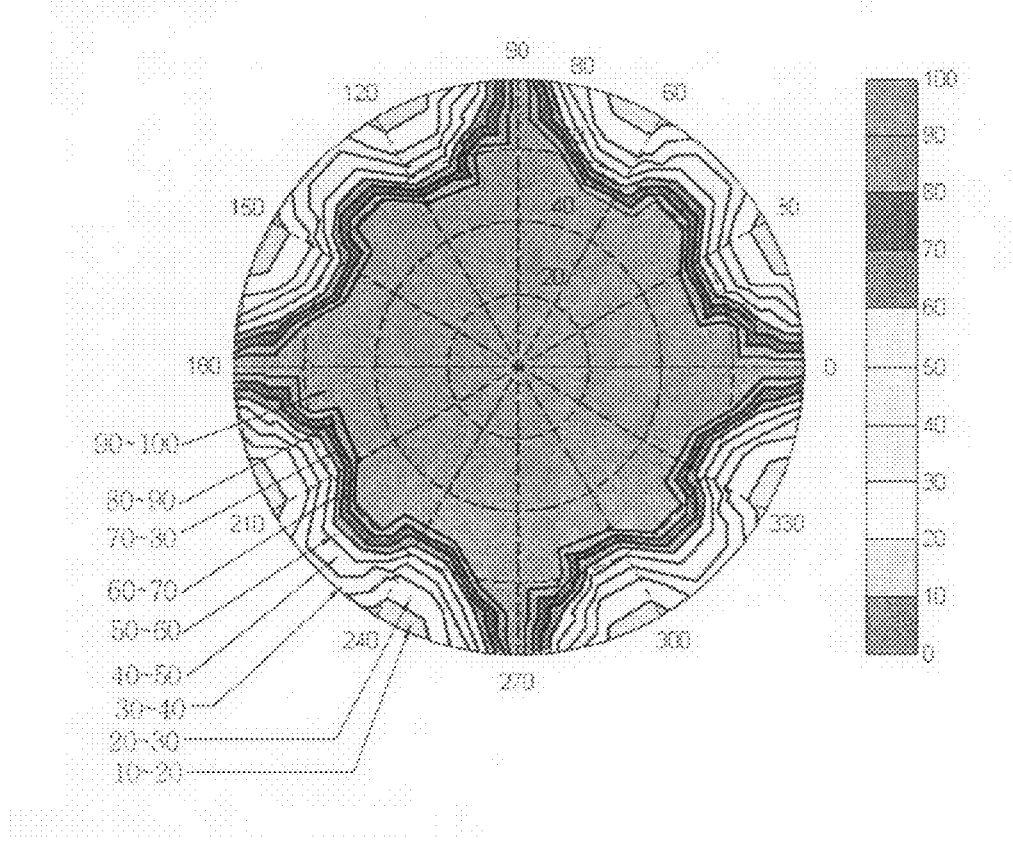
FIG. 10 is a view showing the result of simulation of the contrast ratio of the VA-LCD according to the third embodiment of the present invention when using white light and varying the tilt angle in the range of 0~80° at intervals of 2° with respect to the entire radius angle.

When white light was used, a graph showing contrast at tilt angles from 0 to 80° with respect to the entire radius angle is shown in FIG. 10.

Example 4

The VA-LCD of FIG. 4 according to the fourth embodiment of the present invention was fabricated.

In particular, a VA-LCD panel 5 filled with liquid crystals having a cell gap of 3.35 ☐, a pre-tilt angle of 89°, dielectric anisotropy (Δ∈) of liquid crystals of −4.9, and birefringence (Δn) of 0.098 was used. The VA-panel 5 had a thickness retardation value of 328 nm at a wavelength of 550 nm.

As a +C-film 6, a vertically aligned UV curing type liquid crystal film was used, the thickness retardation value of which was 280 nm at a wavelength of 550 nm. As a first +A-film 7, a stretched cycloolefin polymer film was used, the in-plane retardation value of which was 268 nm. As a second +A-film 9, a stretched cycloolefin polymer film was used, the in-plane retardation value of which was 70 nm at a wavelength of 550 nm.

As the internal protective film of a first polarizing plate 1 and a second polarizing plate 3, a 80 ☐thick TAC was used, the thickness retardation value of which was −65 nm at a wavelength of 550 nm.

Figure 11:
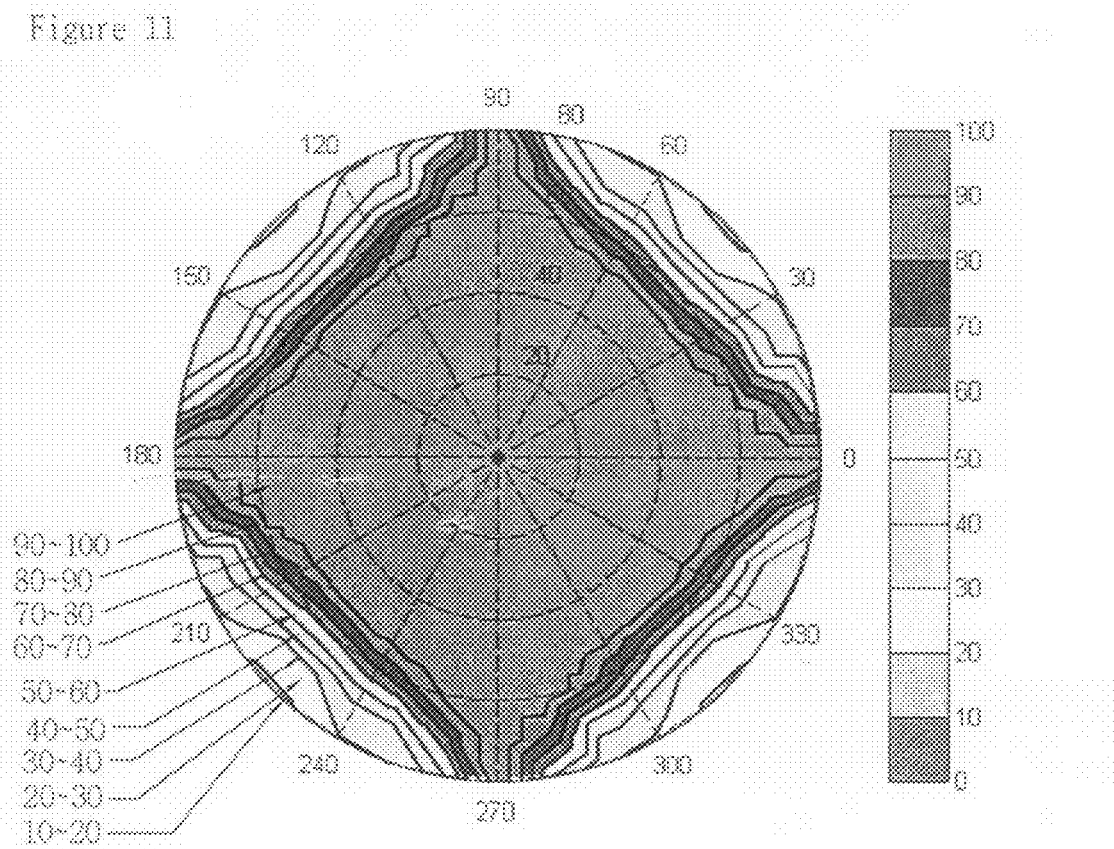
FIG. 11 is a view showing the result of simulation of the contrast ratio of the VA-LCD according to the fourth embodiment of the present invention when using white light and varying the tilt angle in the range of 0~80° at intervals of 2° with respect to the entire radius angle.

When white light was used, a graph showing contrast at tilt angles from 0 to 80° with respect to the entire radius angle is shown in FIG. 11.

Example 5

The VA-LCD of FIG. 5 according to the fifth embodiment of the present invention was fabricated.

In particular, a VA-LCD panel 5 filled with liquid crystals having a cell gap of 3.35 ☐, a pre-tilt angle of 89°, dielectric anisotropy (Δ∈) of liquid crystals of −4.9, and birefringence (Δn) of 0.098 was used. The VA-panel 5 had a thickness retardation value of 328 nm at a wavelength of 550 nm.

As a first +C-film 6, a vertically aligned UV curing type liquid crystal film was used, the thickness retardation value of which was 210 nm at a wavelength of 550 nm.

As a second +C-film 11, a vertically aligned UV curing type liquid crystal film was used, the thickness retardation value of which was 210 nm at a wavelength of 550 nm.

As a first +A-film 7, a stretched cycloolefin polymer film was used, the in-plane retardation value of which was 250 nm at a wavelength of 550 nm. As a second +A-film 9, a stretched cycloolefin polymer film was used, the in-plane retardation value of which was 200 nm at a wavelength of 550 nm.

As the internal protective film of a first polarizing plate 1 and a second polarizing plate 3, a 80 ☐thick TAC was used, the thickness retardation value of which was −65 nm at a wavelength of 550 nm.

Figure 12:
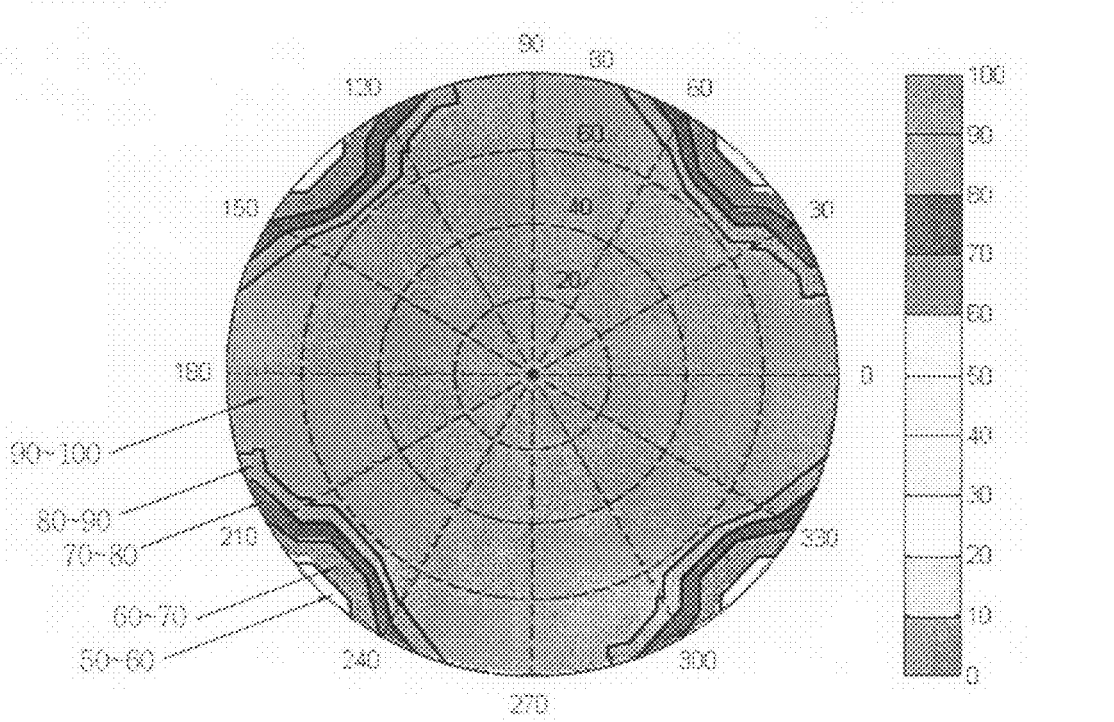
FIG. 12 is a view showing the result of simulation of the contrast ratio of the VA-LCD according to the fifth embodiment of the present invention when using white light and varying the tilt angle in the range of 0~80° at intervals of 2° with respect to the entire radius angle.

When white light was used, a graph showing contrast at tilt angles from 0 to 80° with respect to the entire radius angle is shown in FIG. 12.

Example 6

The VA-LCD of FIG. 6 according to the sixth embodiment of the present invention was fabricated.

In particular, a VA-LCD panel 5 filled with liquid crystals having a cell gap of 3.35 ☐, a pre-tilt angle of 89°, dielectric anisotropy (Δ∈) of liquid crystals of −4.9, and birefringence (Δn) of 0.098 was used. The VA-panel 5 had a thickness retardation value of 328 nm at a wavelength of 550 nm.

As a first +C-film 6, a vertically aligned UV curing type liquid crystal film was used, the thickness retardation value of which was 244 nm at a wavelength of 550 nm.

As a second +C-film 11, a vertically aligned UV curing type liquid crystal film was used, the thickness retardation value of which was 244 nm at a wavelength of 550 nm.

As a first +A-film 7, a stretched cycloolefin polymer film was used, the in-plane retardation value of which was 257 nm at a wavelength of 550 nm. As a second +A-film 9, a stretched cycloolefin polymer film was used, the in-plane retardation value of which was 257 nm at a wavelength of 550 nm.

As the internal protective film of a first polarizing plate 1 and a second polarizing plate 3, a 80 ☐thick TAC was used, the thickness retardation value of which was −65 nm at a wavelength of 550 nm.

Figure 13:
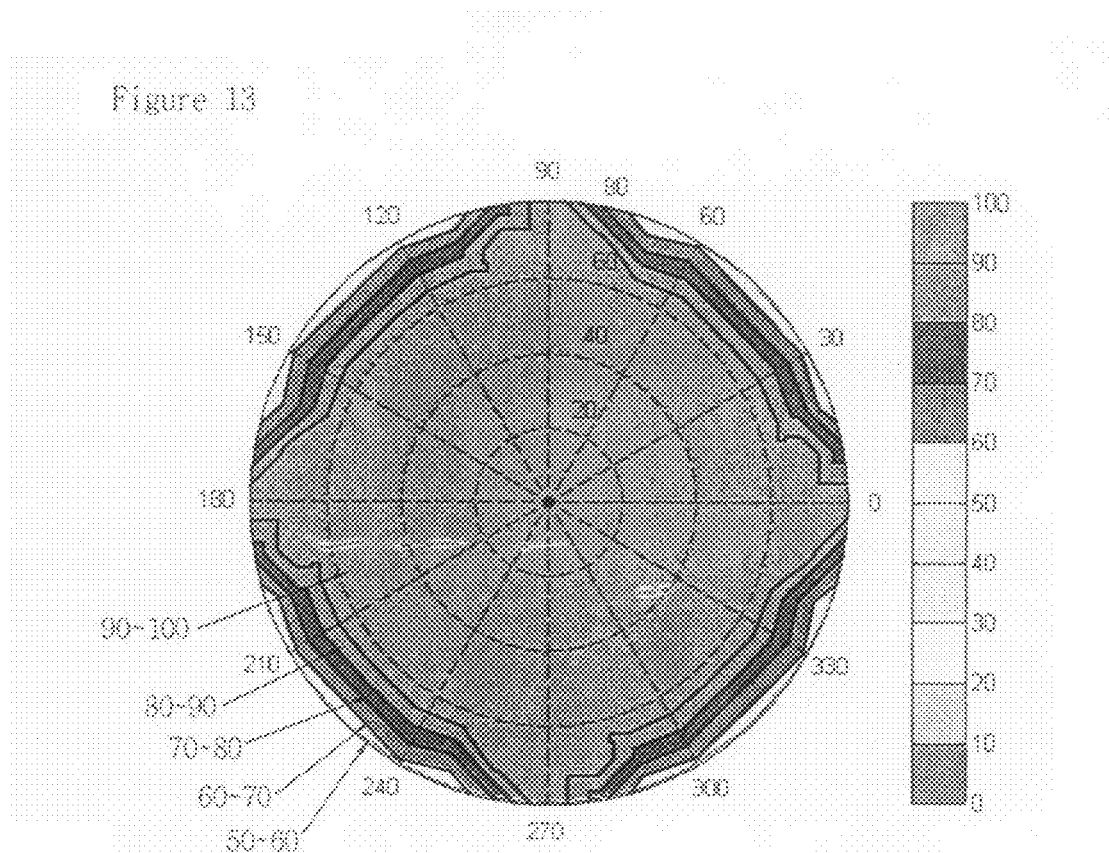
FIG. 13 is a view showing the result of simulation of the contrast ratio of the VA-LCD according to the sixth embodiment of the present invention when using white light and varying the tilt angle in the range of 0~80° at intervals of 2° with respect to the entire radius angle.

When white light was used, a graph showing contrast at tilt angles from 0 to 80° with respect to the entire radius angle is shown in FIG. 13.

Example 7

The VA-LCD of FIG. 7 according to the seventh embodiment of the present invention was fabricated.

In particular, a VA-LCD panel 5 filled with liquid crystals having a cell gap of 3.35 ☐, a pre-tilt angle of 89°, dielectric anisotropy (Δ∈) of liquid crystals of −4.9, and birefringence (Δn) of 0.098 was used. The VA-panel 5 had a thickness retardation value of 328 nm at a wavelength of 550 nm.

As a first +C-film 6, a vertically aligned UV curing type liquid crystal film was used, the thickness retardation value of which was 250 nm at a wavelength of 550 nm. As a second +C-film 11, a vertically aligned UV curing type liquid crystal film was used, the thickness retardation value of which was 204 nm at a wavelength of 550 nm.

As a first +A-film 7, a stretched cycloolefin polymer film was used, the in-plane retardation value of which was 257 nm at a wavelength of 550 nm. As a second +A-film 9, a stretched cycloolefin polymer film was used, the in-plane retardation value of which was 200 nm at a wavelength of 550 nm.

As the internal protective film of a first polarizing plate 1 and a second polarizing plate 3, a 80 ☐thick TAC was used, the thickness retardation value of which was −65 nm at a wavelength of 550 nm.

Figure 14:
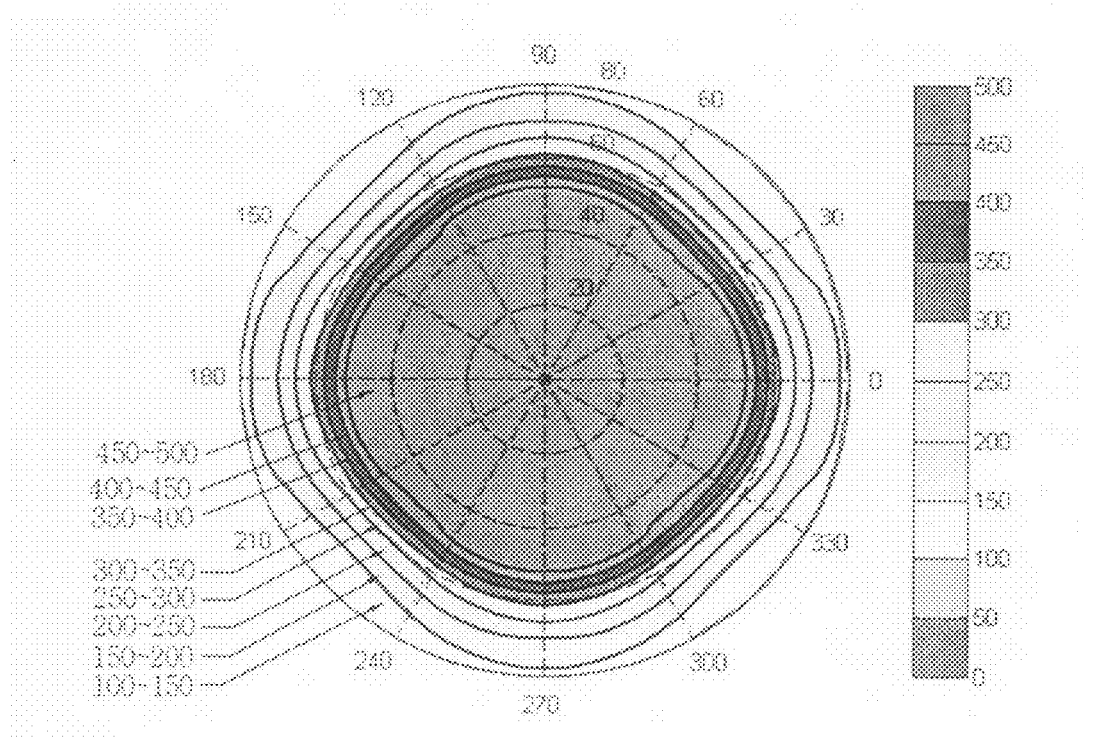
FIG. 14 is a view showing the result of simulation of the contrast ratio of the VA-LCD according to the seventh embodiment of the present invention when using white light and varying the tilt angle in the range of 0~80° at intervals of 2° with respect to the entire radius angle.

When white light was used, a graph showing contrast at tilt angles from 0 to 80° with respect to the entire radius angle is shown in FIG. 14.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

According to the present invention, the contrast of the VA-LCD can be improved at surface-facing angle and tilt angle thereof and color shift depending on the viewing angle in a dark state can be minimized, thus greatly increasing the viewing angle range of the VA-LCD.

The invention claimed is:

1. A vertically aligned liquid crystal display comprising:
   a first polarizing plate and a second polarizing plate having absorption axes perpendicular to each other;
   a vertically aligned panel provided between the first polarizing plate and the second polarizing plate, wherein the vertically aligned panel includes vertically aligned liquid crystals having negative dielectric anisotropy;
   one or more first +A-films and one or more first +C-films provided between the first polarizing plate and the vertically aligned panel, wherein the first +C-film is positioned between the first polarizing plate and the first +A-film, and wherein an optic axis of the first +A-film is perpendicular to the absorption axis of the first polarizing plate;
   one or more second +A-films between the second polarizing plate and the vertically aligned panel, wherein an optic axis of the second +A-film is perpendicular to the absorption axis of the second polarizing plate, and wherein the first +A-film has an in-plane retardation value ranging from 180 nm to 250 nm at a wavelength of 550 nm, the first +C-film has a thickness retardation value ranging from 200 nm to 600 nm at a wavelength of 550 nm, and the second +A-film has an in-plane retardation value ranging from 10 nm to 150 nm at a wavelength of 550 nm.

2. A vertically aligned liquid crystal display comprising:
   a first polarizing plate and a second polarizing plate having absorption axes perpendicular to each other;
   a vertically aligned panel provided between the first polarizing plate and the second polarizing plate, wherein the vertically aligned panel includes vertically aligned liquid crystals having negative dielectric anisotropy;
   one or more first +A-films and one or more first +C-films provided between the first polarizing plate and the vertically aligned panel, wherein the first +C-film is positioned between the first polarizing plate and the first +A-film, and wherein an optic axis of the first +A-film is parallel to the absorption axis of the first polarizing plate;
   one or more second +A-films between the second polarizing plate and the vertically aligned panel, wherein an optic axis of the second +A-film is perpendicular to the absorption axis of the second polarizing plate, and wherein the first +A-film has an in-plane retardation value ranging from 200 nm to 300 nm at a wavelength of 550 nm, the first +C-film has a thickness retardation value ranging from 180 nm to 600 nm at a wavelength of 550 nm, and the second +A-film has an in-plane retardation value ranging from 10 nm to 150 nm at a wavelength of 550 nm.

3. A vertically aligned liquid crystal display comprising:
   a first polarizing plate and a second polarizing plate having absorption axes perpendicular to each other;
   a vertically aligned panel provided between the first polarizing plate and the second polarizing plate, wherein the vertically aligned panel includes vertically aligned liquid crystals having negative dielectric anisotropy;
   one or more first +A-films and one or more first +C-films provided between the first polarizing plate and the vertically aligned panel, wherein the first +C-film is positioned between the first polarizing plate and the first +A-film, and wherein an optic axis of the first +A-film is perpendicular to the absorption axis of the first polarizing plate;
   one or more second +A-films and one or more second +C-films between the second polarizing plate and the vertically aligned panel, wherein the second +C-film is positioned between the second polarizing plate and the second +A-film, wherein an optic axis of the second +A-film is perpendicular to the absorption axis of the second polarizing plate, and wherein the first +A-film has an in-plane retardation value ranging from 240 nm to 270 nm at a wavelength of 550 nm, the second +A-film has an in-plane retardation value ranging from 190 nm to 220 nm at a wavelength of 550 nm, and the first +C-film and the second +C-film have a thickness retardation value ranging from 100 nm to 600 nm at a wavelength of 550 nm.

4. A vertically aligned liquid crystal display comprising:
   a first polarizing plate and a second polarizing plate having absorption axes perpendicular to each other;
   a vertically aligned panel provided between the first polarizing plate and the second polarizing plate, wherein the vertically aligned panel includes vertically aligned liquid crystals having negative dielectric anisotropy;
   one or more first +A-films and one or more first +C-films provided between the first polarizing plate and the vertically aligned panel, wherein the first +C-film is positioned between the first polarizing plate and the first +A-film, and wherein an optic axis of the first +A-film is parallel to the absorption axis of the first polarizing plate;
   one or more second +A-films and one or more second +C-films between the second polarizing plate and the vertically aligned panel, wherein the second +C-film is positioned between the second polarizing plate and the second +A-film, wherein an optic axis of the second +A-film is parallel to the absorption axis of the second polarizing plate, and wherein the first +A-film and the second +A-film have an in-plane retardation value ranging from 240 nm to 270 nm at a wavelength of 550 nm, and the first +C-film and the second +C-film have a thickness retardation value ranging from 100 nm to 600 nm at a wavelength of 550 nm.

5. A vertically aligned liquid crystal display comprising:
   a first polarizing plate and a second polarizing plate having absorption axes perpendicular to each other;
   a vertically aligned panel provided between the first polarizing plate and the second polarizing plate, wherein the vertically aligned panel includes vertically aligned liquid crystals having negative dielectric anisotropy;
   one or more first +A-films and one or more first +C-films are provided between the first polarizing plate and the vertically aligned panel, wherein the first +C-film is positioned between the first polarizing plate and the first +A-film, and wherein an optic axis of the first +A-film is parallel to the absorption axis of the first polarizing plate;
   one or more second +A-films and one or more second +C-films between the second polarizing plate and the vertically aligned panel, wherein the second +C-film is positioned between the second polarizing plate and the second +A-film, wherein an optic axis of the second +A-film is perpendicular to the absorption axis of the second polarizing plate, and wherein the first +A-film has an in-plane retardation value ranging from 240 nm to 270 nm at a wavelength of 550 nm, the second +A-film has an in-plane retardation value ranging from 190 nm to 220 nm at a wavelength of 550 nm, and the first +C-film and the second +C-film have a thickness retardation value ranging from 100 nm to 600 nm at a wavelength of 550 nm.

6. The vertically aligned liquid crystal display according to any one of claims 1 to 5, wherein the +A-film comprises at least one selected from among a stretched cycloolefin polymer film, a stretched polycarbonate film, and a horizontally aligned UV curing type liquid crystal film.

7. The vertically aligned liquid crystal display according to anyone of claims 1 to 5, wherein the +C-film comprises at least one of a vertically aligned UV curing type liquid crystal film and a biaxially stretched polymer film.

8. The vertically aligned liquid crystal display according to any one of claims 1 to 5, wherein the first polarizing plate and the second polarizing plate have an internal protective film having a thickness retardation value of 0 or a negative thickness retardation value.

9. The vertically aligned liquid crystal display according to claim 8, wherein the internal protective film comprises at least one selected from among an unstretched cycloolefin polymer film, a triacetate cellulose film, and a polynorbornene film.

10. The vertically aligned liquid crystal display according to claim 1 or claim 2, wherein the second +A-film function as an internal protective film of the second polarizing plate.

11. The vertically aligned liquid crystal display according to any one of claims 3 to 5, wherein the first +C-film and/or the second +C-film function as an internal protective film of the first polarizing plate and/or the second polarizing plate, respectively.

12. The vertically aligned liquid crystal display according to any one of claims 1 to 5, which uses a multidomain vertically aligned mode or a vertically aligned mode using a chiral additive, in which the vertically aligned panel comprises a liquid crystal cell having a cell gap of 3-8 nm.

* * * * *